(12) United States Patent
Sangawa (10) Patent No.: US 9,583,919 B2
(45) Date of Patent: Feb. 28, 2017

(54) UNIT APPARATUS

(71) Applicant: Mitsubishi Electric Corporation, Chiyoda-ku, Tokyo (JP)

(72) Inventor: Takayoshi Sangawa, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 14/781,187

(22) PCT Filed: Mar. 6, 2014

(86) PCT No.: PCT/JP2014/055805
§ 371 (c)(1),
(2) Date: Sep. 29, 2015

(87) PCT Pub. No.: WO2015/029474
PCT Pub. Date: Mar. 5, 2015

(65) Prior Publication Data
US 2016/0056616 A1    Feb. 25, 2016

(30) Foreign Application Priority Data
Aug. 26, 2013 (JP) .................... 2013-174103

(51) Int. Cl.
*H02B 1/26* (2006.01)
*H02B 13/025* (2006.01)
*H02B 1/36* (2006.01)

(52) U.S. Cl.
CPC .............. *H02B 1/26* (2013.01); *H02B 1/36* (2013.01); *H02B 13/025* (2013.01)

(58) Field of Classification Search
CPC .......... H01B 11/00; H01H 9/34; H01H 33/70; H02B 13/025; H02B 1/26; H02B 1/30; H02B 1/32

(Continued)

(56) References Cited

U.S. PATENT DOCUMENTS 3,989,986 A * 11/1976 Farley .................. H02B 1/21
                                                           200/293
5,457,296 A * 10/1995 Neill .................. H02B 13/025
                                                           200/306
(Continued)

FOREIGN PATENT DOCUMENTS

JP       48-22130 U      3/1973
JP       51-162941 U    12/1976
(Continued)

OTHER PUBLICATIONS

International Search Report (PCT/ISA/210) mailed on Jun. 3, 2014, by the Japanese Patent Office as the International Searching Authority for International Application No. PCT/JP2014/055805.

*Primary Examiner* — Dimary Lopez Cruz
(74) *Attorney, Agent, or Firm* — Buchanan Ingersoll & Rooney PC (57) ABSTRACT

In a unit apparatus in which units each equipped with a device are disposed in multiple stages and are attached to a housing, the unit apparatus includes: a device-protecting cover which is disposed on the front surface side of the unit and is formed by bending an upper part or a lower part thereof to protect the device; and a unit frame body having a unit base which is disposed in lapped relation on one of the bent upper part surface or the bent lower part surface of the device-protecting cover. The device-protecting cover and the unit frame body constitute a unit chamber; and the units are disposed in multiple stages in said housing, whereby the other of the bent upper part surface or the bent lower part surface of said bent device-protecting cover is shielded.

4 Claims, 6 Drawing Sheets

(58) Field of Classification Search
USPC .......... 174/17 R, 520; 361/679.01, 601, 605,
361/608, 652, 656, 673, 634, 724, 809,
361/82, 622, 627, 631; 218/147, 155,
218/156, 90; 220/50.07, 50.32; 200/237,
200/304, 333, 306
See application file for complete search history.

(56) References Cited

U.S. PATENT DOCUMENTS

| | | | | |
|---|---|---|---|---|
| 6,501,649 | B2 * | 12/2002 | Yanes | H02B 1/28 |
| | | | | 165/80.3 |
| 8,737,043 | B2 * | 5/2014 | Hughes | H02B 1/28 |
| | | | | 361/631 |
| 8,934,218 | B2 * | 1/2015 | Morris | H02B 1/36 |
| | | | | 361/627 |

FOREIGN PATENT DOCUMENTS

| | | |
|---|---|---|
| JP | 61-236312 A | 10/1986 |
| JP | 7-87627 A | 3/1995 |

* cited by examiner

UNIT APPARATUS

TECHNICAL FIELD

The present invention relates to a unit apparatus which is for preventing an arc gas, which is discharged from a device such as a breaker during a short-circuit fault, from entering into upper and lower units.

BACKGROUND ART

A conventional unit apparatus like a distribution board has no partition between units and thus becomes in a communicated state; and accordingly, an arc gas discharged from a device such as a breaker during a short-circuit fault stretches to the upper and lower units and the fault is likely to be enlarged.

Figure 10:
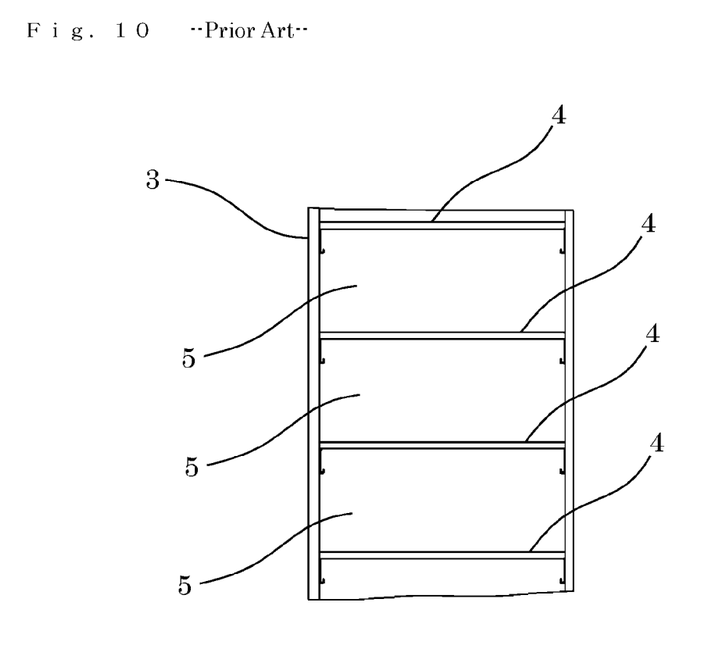
FIG. 10 is a front view showing a conventional unit apparatus.
Figure 11:
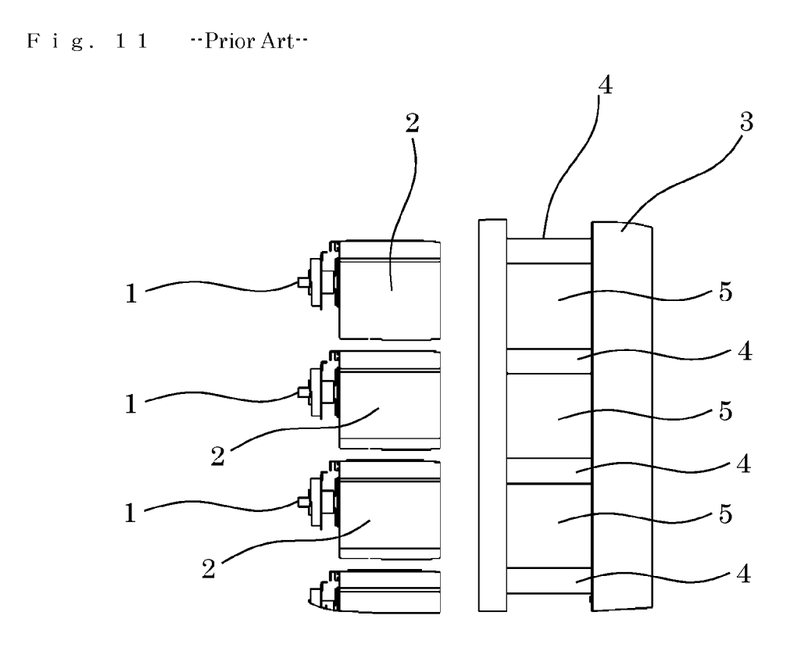
FIG. 11 is a side view showing the conventional unit apparatus.

As shown in FIG. 10 and FIG. 11, a conventional unit apparatus like a control center is structured such that there is not a partition structure which is for shielding between units 1 on the unit 1 side, a partition plate 4 which is for partitioning between the units 1 is previously provided on the housing 3 side at a position matched with the height of each unit 1, a unit chamber 5 is constituted on the housing 3 side separately from constituent components of the unit 1 on the unit 1 side, and an arc gas discharged from a device 2 such as a breaker is shielded.

Thus, the partition plate 4 needs to be separately provided on the housing 3 side in addition to the constituent components of the unit 1; and accordingly, it causes increases in the number of components and an assembly work time. Further, when a change in stacking and a change in size of the unit 1 occur, the partition plate 4 provided on the housing 3 side also needs a repartition work in accordance with the change in stacking of the unit 1 and it causes an increase in cost.

PRIOR ART DOCUMENT

Patent Document

Patent Document 1: JP-A-S61-236312

SUMMARY OF THE INVENTION

Problems to be Solved by the Invention

The aforementioned conventional unit apparatus like the distribution board has no partition between the units 1 and thus becomes in the communicated state; and accordingly, the arc gas discharged from the device such as the breaker during the short-circuit fault stretches to the upper and lower units and the fault is likely to be enlarged.

Furthermore, the conventional unit apparatus like the control center is structured such that there is not the partition structure which is for shielding between the units 1 on the unit 1 side to which the device 2 such as the breaker is attached, the partition plate 4 which is for partitioning between the units 1 is previously provided on the housing 3 side at the position matched with the height of each unit 1, the unit chamber 5 is constituted on the housing 3 side separately from the constituent components of the unit 1 on the unit 1 side, and the arc gas discharged from the device 2 such as the breaker is shielded. Thus, the partition plate 4 needs to be separately provided on the housing 3 side in addition to the constituent components of the unit 1; and accordingly, it causes the increases in the number of components and the assembly work time. Further, when the change in stacking and the change in size of the unit 1 occur, the partition plate 4 provided on the housing 3 side also needs the repartition work in accordance with the change in stacking and the change in size of the unit 1 and it causes the increase in cost.

The present invention has been made to solve the above described problem, and an object of the present invention is to provide a unit apparatus which can shield between units by a simple configuration.

Means for Solving the Problems

According to the present invention, there is provided a unit apparatus in which units each equipped with a device are disposed in multiple stages and are attached to a housing. In the unit apparatus, the unit apparatus includes: a device-protecting cover which is disposed on the front surface side of the unit and is formed by bending an upper part or a lower part thereof to protect the device; and a unit frame body having a unit base which is disposed in lapped relation on one of the bent upper part surface or the bent lower part surface of the device-protecting cover. The device-protecting cover and the unit frame body constitute a unit chamber; and the units are disposed in multiple stages in said housing, whereby the other of the bent upper part surface or the bent lower part surface of said bent device-protecting cover is shielded.

Advantageous Effect of the Invention

According to the unit apparatus according to the present invention, there can be obtained the unit apparatus which can shield between units by a simple configuration.

MODE FOR CARRYING OUT THE INVENTION

Embodiment 1.

Figure 1:
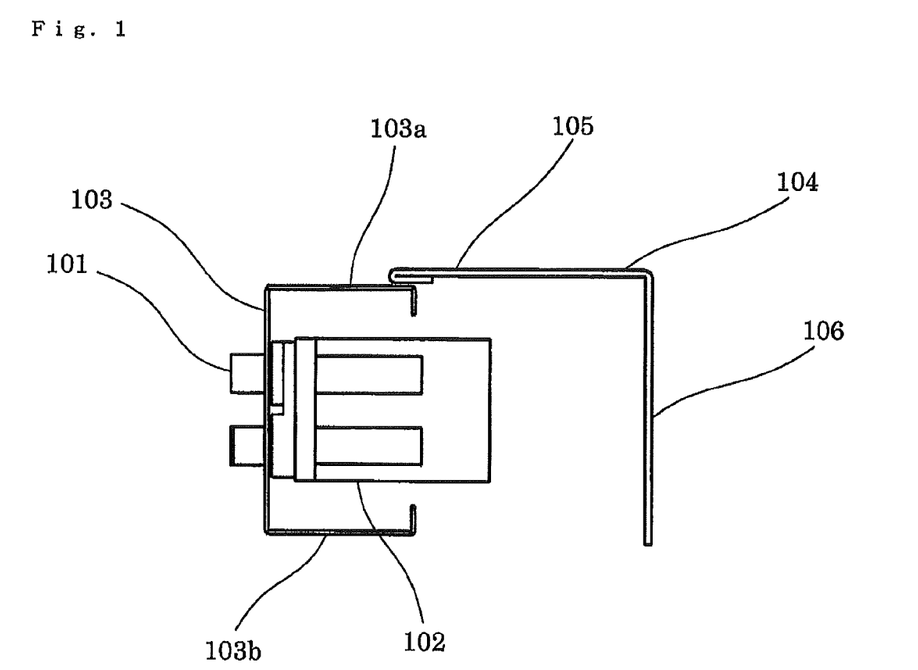
FIG. 1 is a side view showing a unit single body in a unit apparatus according to Embodiment 1 of the present invention.
Figure 2:
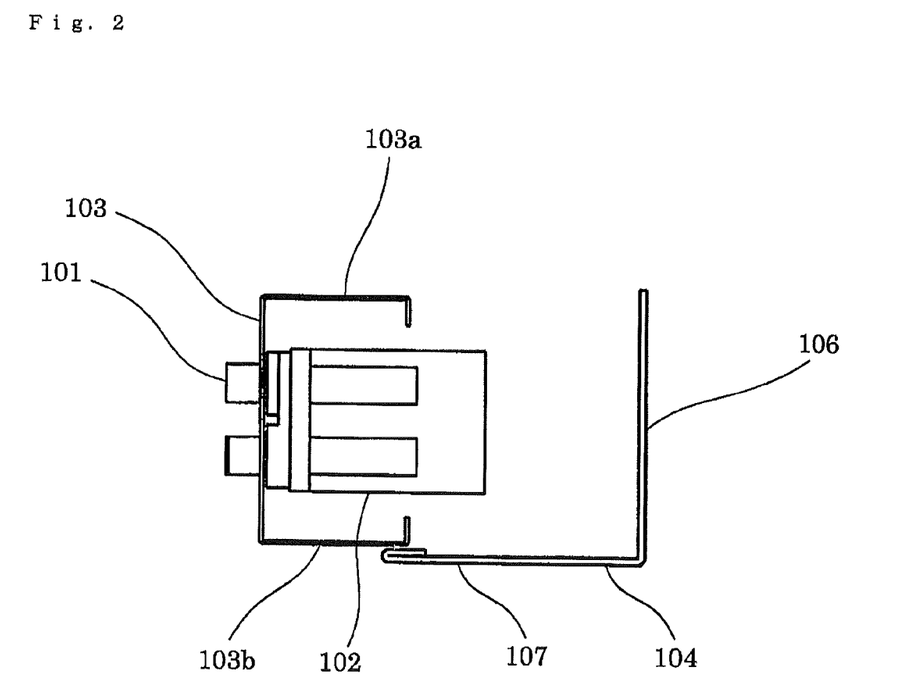
FIG. 2 is a side view showing a unit single body in the unit apparatus according to Embodiment 1 of the present invention.
Figure 3:
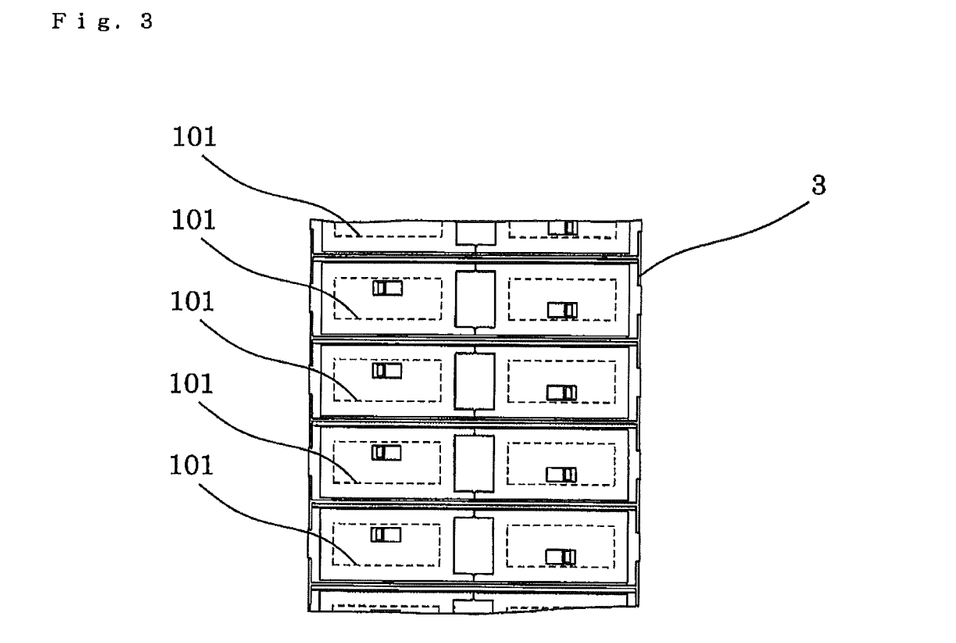
FIG. 3 is a front view showing a multi-placed state in the unit apparatus according to Embodiment 1 of the present invention.
Figure 4:
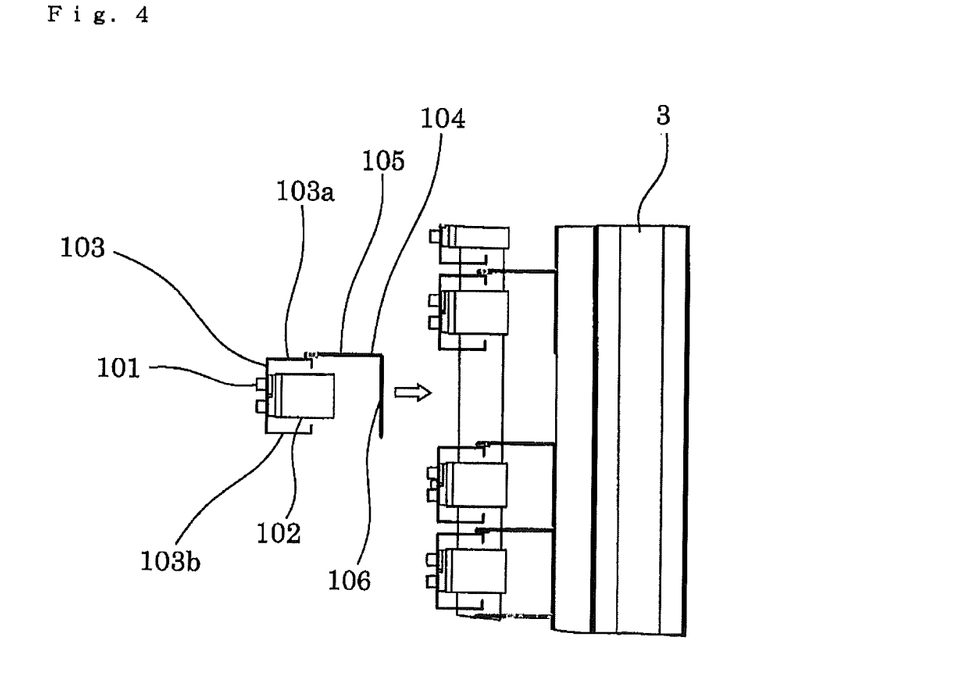
FIG. 4 is a side view showing the multi-placed state in the unit apparatus according to Embodiment 1 of the present invention.
Figure 5:
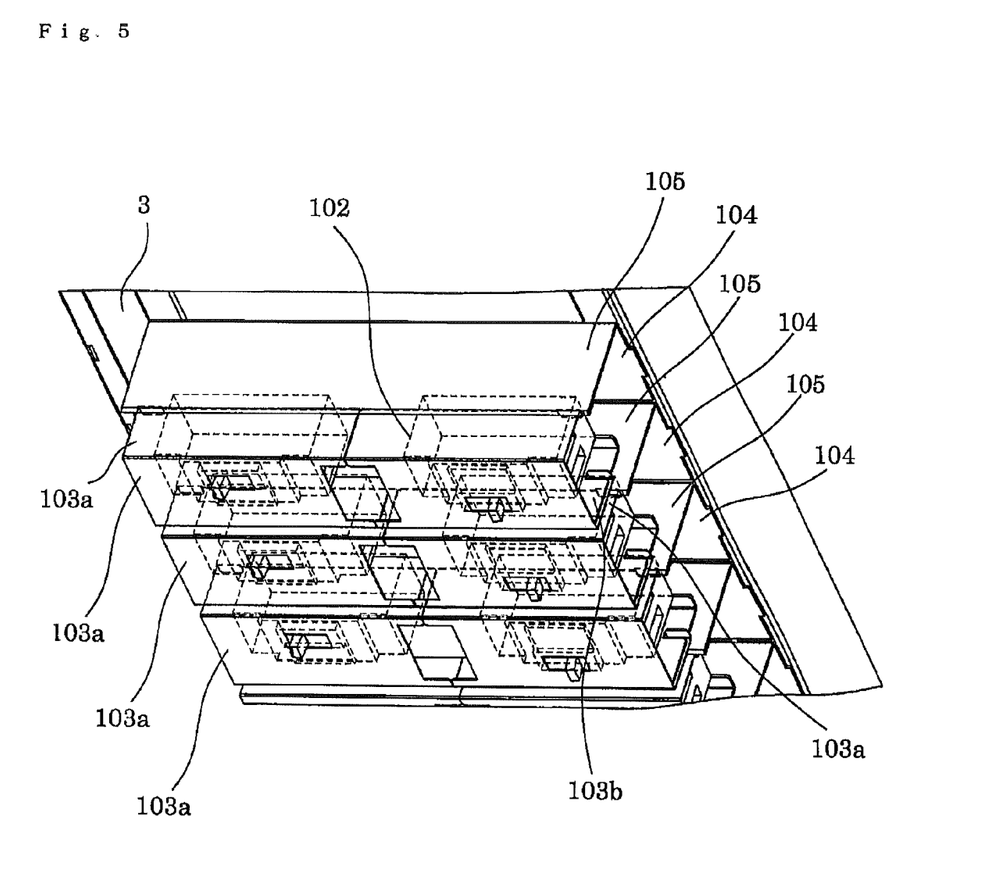
FIG. 5 is a perspective view showing the multi-placed state in the unit apparatus according to Embodiment 1 of the present invention.

Hereinafter, Embodiment 1 of the present invention will be described with reference to FIG. 1 to FIG. 5. Then, in each of the drawings, identical or equivalent members and portions will be described with the same reference numerals (and letters) assigned thereto. FIG. 1 is a side view showing a unit single body in a unit apparatus according to Embodiment 1 of the present invention. FIG. 2 is a side view showing a unit single body in the unit apparatus according to Embodiment 1 of the present invention. FIG. 3 is a front view showing a multi-placed state in the unit apparatus according to Embodiment 1 of the present invention. FIG. 4 is a side view showing the multi-placed state in the unit apparatus according to Embodiment 1 of the present invention. FIG. 5 is a perspective view showing the multi-placed state in the unit apparatus according to Embodiment 1 of the present invention.

In order to solve the aforementioned problems, there needs to provide the partition structure, which can shield the arc gas, between the units 1 without providing the partition plate 4 on the housing 3 side.

In this Embodiment 1, as shown in FIG. 1 to FIG. 5, a device-protecting cover 103, which is disposed on the front surface side of a unit 101 to which a device 102 such as a breaker is attached, is formed in a channel shape by bending an upper part 103a and a lower part 103b thereof. In the case of FIG. 1, there is provided a unit frame body 104 which has a unit base 105 disposed in extended and lapped relation on the upper part 103a surface of the device-protecting cover 103, a unit chamber 106 is formed by the device-protecting cover 103 and the unit frame body 104, and a partition function is provided by the unit base 105 of the unit frame body 104 extended on the upper part 103a surface of the device-protecting cover 103. In the case of FIG. 2, there is provided a unit frame body 104 which has a unit base 107 disposed in extended and lapped relation on the lower part 103b surface of the device-protecting cover 103, a unit chamber 106 is formed by the device-protecting cover 103 and the unit frame body 104, and a partition function is provided by the unit base 107 of the unit frame body 104 extended on the lower part 103b surface of the device-protecting cover 103.

As described above, the unit base 105 or the unit base 107 of the unit frame body 104 is configured to have the partition function by attaching the unit base 105 or the unit base 107 of the unit frame body 104 in extended and lapped relation on either the upper part 103a surface or the lower part 103b surface of the device-protecting cover 103. By doing so, a leakage of an arc gas discharged from the device 102 such as the breaker to the unit base 105 side or the unit base 107 side of the unit frame body 104 having the partition function can be minimized. Then, as shown in FIG. 4, the units 101 having the partition function are multi-stacked and placed in the housing 3 in such a manner, whereby automatically shielding between all the units 101 can be achieved and the arc gas discharged from the device 102 such as the breaker during a short-circuit fault can be prevented from entering into the units 101 disposed above and below.

Then, as in the aforementioned conventional unit apparatus, the partition plate 4 does not need to be separately provided on the housing 3 side; and therefore, increases in the number of components and an assembly work time are not caused and an increase in cost can also be minimized. Further, the partition plate 4 is not provided on the housing 3 side; and therefore, it is capable of easily dealing with, even in the occurrence of a change in stacking and a change in size of the unit.

Embodiment 2.

Figure 6:
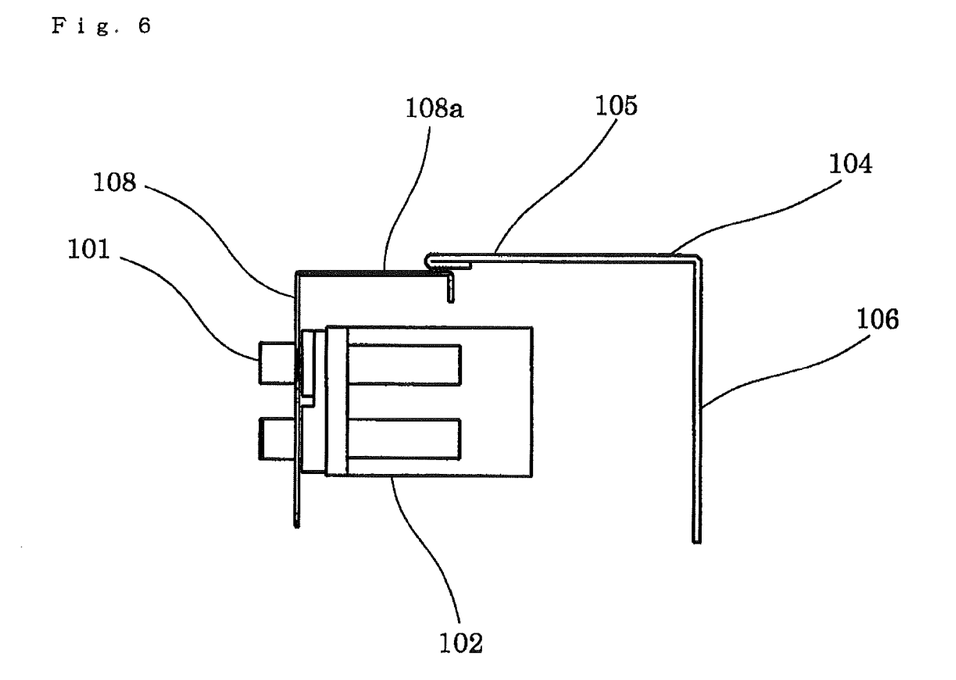
FIG. 6 is a side view showing a unit single body in a unit apparatus according to Embodiment 2 of the present invention.
Figure 7:
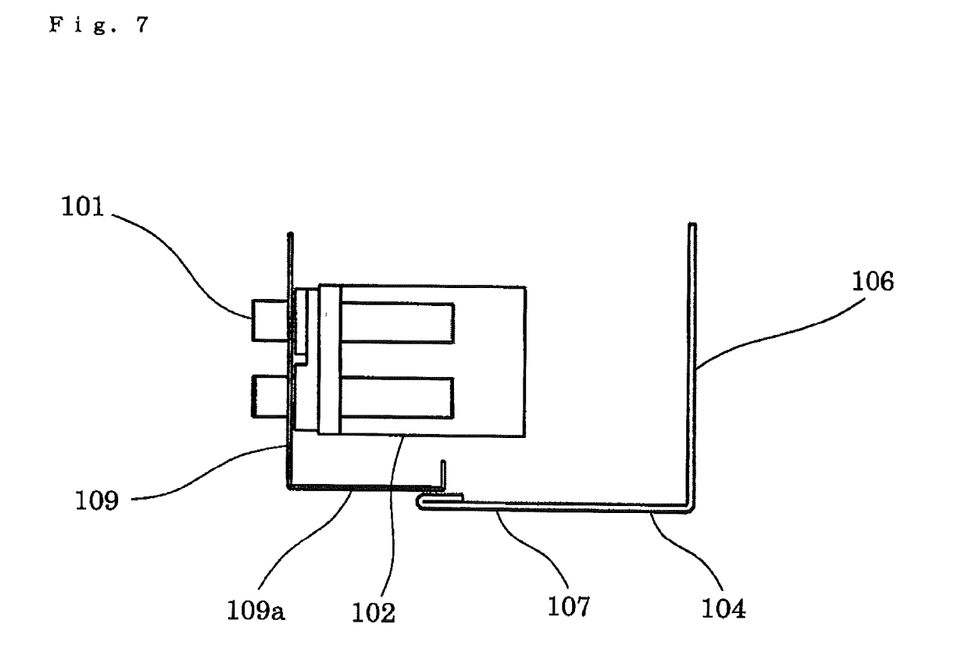
FIG. 7 is a side view showing a unit single body in the unit apparatus according to Embodiment 2 of the present invention.

Embodiment 2 of the present invention will be described with reference to FIG. 6 and FIG. 7. Then, in each of the drawings, identical or equivalent members and portions will be described with the same reference numerals (and letters) assigned thereto. FIG. 6 is a side view showing a unit single body in a unit apparatus according to Embodiment 2 of the present invention. FIG. 7 is a side view showing a unit single body in a unit apparatus according to Embodiment 2 of the present invention.

In the aforementioned Embodiment 1, there has been described the case in which the device-protecting cover 103 is formed in the channel shape by bending the upper part 103a and the lower part 103b thereof. However, in this Embodiment 2, a device-protecting cover is structured to have a partition function by bending either an upper part or a lower part thereof.

In FIG. 6, the partition function is provided by bending the upper part 108a side of a device-protecting cover 108 and by arranging a unit base 105 of a unit frame body 104 in extended and lapped relation on the upper part 108a surface of the device-protecting cover 108. The units 101 having the partition function are multi-stacked and placed in a housing 3 in such a manner, whereby automatically shielding between all the units 101 can be achieved and an arc gas discharged from a device 102 such as a breaker during a short-circuit fault can be prevented from entering into the units 101 disposed above and below.

Furthermore, in FIG. 7, the partition function is provided by reversely bending the lower part 109a side of a device-protecting cover 109 and by arranging a unit base 107 of a unit frame body 104 in extended and lapped relation on the lower part 109a surface of the device-protecting cover 109. The units 101 having the partition function are multi-stacked and placed in the housing 3 in such a manner, whereby automatically shielding between all the units 101 can be achieved and the arc gas discharged from the device 102 such as the breaker during the short-circuit fault can be prevented from entering into the units 101 disposed above and below.

Embodiment 3.

Figure 8:
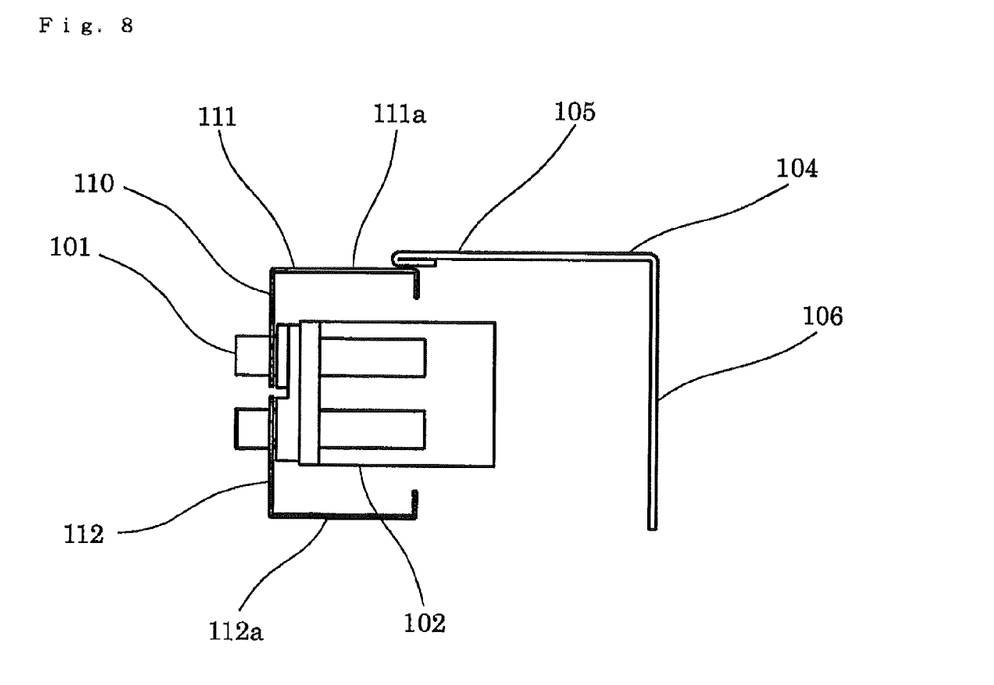
FIG. 8 is a side view showing a unit single body in a unit apparatus according to Embodiment 3 of the present invention.
Figure 9:
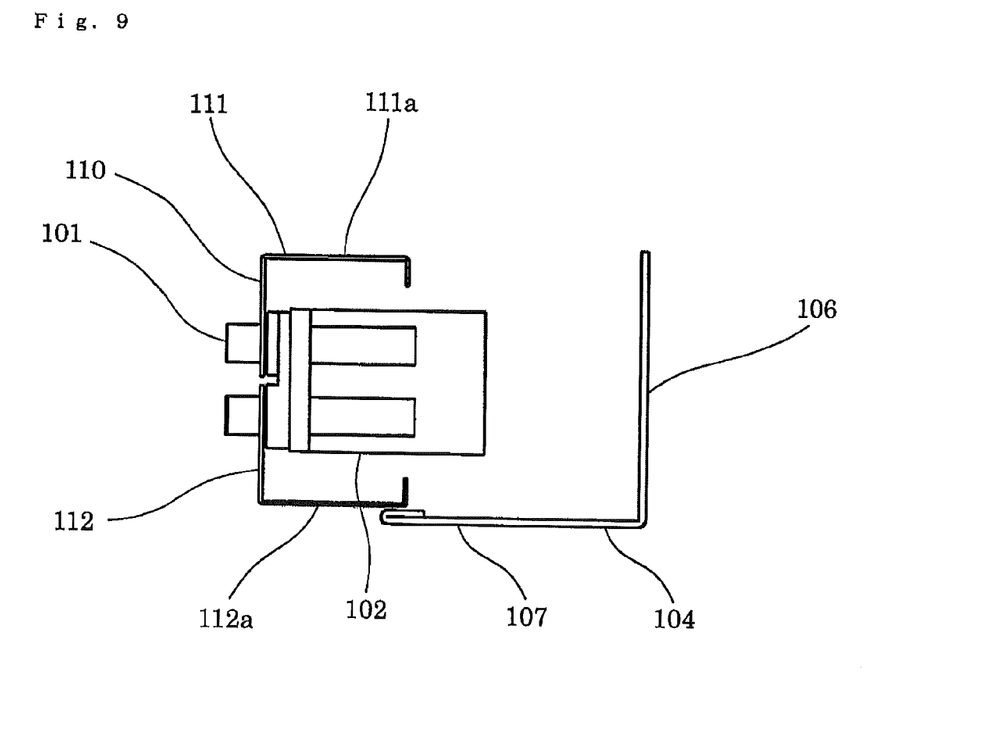
FIG. 9 is a side view showing a unit single body in the unit apparatus according to Embodiment 3 of the present invention.

Embodiment 3 of the present invention will be described with reference to FIG. 8 and FIG. 9. Then, in each of the drawings, identical or equivalent members and portions will be described with the same reference numerals (and letters) assigned thereto. FIG. 8 is a side view showing a unit single body in a unit apparatus according to Embodiment 3 of the present invention. FIG. 9 is a side view showing a unit single body in a unit apparatus according to Embodiment 3 of the present invention.

In the aforementioned Embodiment 1, there has been described the case in which the device-protecting cover 103 is formed in the channel shape by bending the upper part 103a and the lower part 103b thereof. However, in this Embodiment 3, a device-protecting cover is composed of an upper cover body formed by bending an upper part thereof and a lower cover body formed by bending a lower part thereof.

FIG. 8 shows a case where a device-protecting cover 110 is composed of an upper cover body 111 formed by bending an upper part 111a and a lower cover body 112 formed by bending a lower part 112a. Then, a partition function is provided by arranging a unit base 105 of a unit frame body 104 in extended and lapped relation on the upper part 111*a* surface of the upper part cover body 111 of the device-protecting cover 110. Units 101 having the partition function are multi-stacked and placed in a housing 3 in such a manner, whereby automatically shielding between all the units 101 can be achieved and an arc gas discharged from a device 102 such as a breaker during a short-circuit fault can be prevented from entering into the units 101 disposed above and below.

Furthermore, in FIG. 9, the partition function is provided by reversely arranging a unit base 107 of a unit frame body 104 in extended and lapped relation on the lower part 112*a* surface of the lower part cover body 112 of the device-protecting cover 110. The units 101 having the partition function are multi-stacked and placed in the housing 3 in such a manner, whereby automatically shielding between all the units 101 can be achieved and the arc gas discharged from the device 102 such as the breaker during the short-circuit fault can be prevented from entering into the units 101 disposed above and below.

Incidentally, the present invention can freely combine the respective embodiments and appropriately change and/or omit the respective embodiments, within the scope of the present invention.

INDUSTRIAL APPLICABILITY

The present invention is suitable for achieving a unit apparatus capable of shielding between units by a simple configuration.

The invention claimed is:

1. A unit apparatus in which units each equipped with a respective device are disposed in multiple stages and are attached to a housing, wherein said unit apparatus includes, for each unit:
a respective device-protecting cover which is disposed on the front surface side of said unit and which is formed by bending an upper part or a lower part thereof toward the rear of said unit to protect said respective device; and
a respective unit frame body having a unit base which is disposed in lapped relation on a first surface of one of the upper part or the lower part of said device-protecting cover, the one part being bent, wherein said device-protecting cover and said unit frame body constitute a respective unit chamber, and
said respective unit chambers of said units are disposed in the multiple stages in said housing, whereby a second surface of the other of the upper part or the lower part of said respective bent device-protecting cover is shielded and is free from contact with the respective unit frame body.

2. The unit apparatus according to claim 1, wherein said respective device-protecting cover is formed in a channel shape by bending the upper part and the lower part.

3. The unit apparatus according to claim 1, wherein said respective device-protecting cover is composed of an upper cover body formed by bending the upper part, the upper cover body including at least the upper part, and a lower cover body formed by bending the lower part, the lower cover body including at least the lower part.

4. The unit apparatus according to claim 1, wherein the respective device-protecting covers of two adjacent unit chambers are separated only by the respective unit frame body of one of the two adjacent unit chambers.

* * * * *